United States Patent Office

2,947,635
Patented Aug. 2, 1960

2,947,635

METHOD OF PREPARING PUFFED SKIN PRODUCTS

William D. Paynter and Elwood W. Kielsmeier, Madison, Wis., assignors to Oscar Mayer & Co., Inc., Chicago, Ill., a corporation of Illinois No Drawing. Filed May 15, 1958, Ser. No. 735,376

5 Claims. (Cl. 99—107)

The present invention is directed to new and improved methods of preparing a puffed pork edible skin or rind product, such as bacon rind, wherein skin pieces are expanded by cooking to produce a thin walled, greatly expanded cellular structure which upon drying is crisp, pleasant tasting and readily edible. More particularly, the present invention deals with preparing a product of the type described in a manner to set and retain the extent of expansion resulting from heat expansion of skin pieces by use of a new and improved cooling and residual moisture removal step which establishes an internal pressure within the cellular structure of the expanded skin pieces to prevent collapse thereof during protein setting and residual moisture removal.

Puffed bacon skin products have been on the market for some time. Included in the conventional methods of preparing this type of product is at least one oil bath cooking step wherein the bacon skin pieces are expanded to a substantial extent to be converted into thin walled, cellular structures. The expanded skin pieces upon being removed from the popping or puffing hot oil bath must be dried to impart thereto the requisite crispness for marketing. In following known practices, the extent to which the skin has expanded during the puffing step is often decreased to a substantial degree during subsequent drying and the protein defining the thin walls of the cells will contract or shrivel to an extent that final set expansion of the skin is appreciably less than that actually obtained during the puffing step. With collapsing during drying and cooling, it has also been found that the product assumes a quality of toughness which is undesirable. Toughness is attributable to inadequate moisture removal. Reduction in moisture content of the collagen on an economical commercial basis due to its natural affinity for water has been considered a difficult problem.

It is an object of the present invention to provide a new and improved method of preparing puffed skin products wherein the skin is greatly expanded to create a thin walled cellular structure with the degree of expansion obtained being retained by the utilization of a new and improved pressure differential residual moisture removal procedure which in providing for residual moisture removal not only prevents undesirable toughness in the puffed product but also provides for relatively fast cooling and collagen setting.

Still a further object is to provide a new and improved method of preparing a bacon rind or fat back skin product which includes an improved combination of conditioning, cooking and treating steps resulting in the formation of a superior product which is greatly expanded, of thin wall cellular structure, crisp, brittle, appetizing and readily edible.

Other objects not specifically set forth will become apparent from the following detailed description of the present invention.

The important concept of the present invention resides in the use of differential pressure processing of puffed pork skin products. There are several different and acceptable procedures which may be followed in conditioning the skins followed by popping of the skins to transform the same into the desired greatly expanded, cellular structures. In order to retain the greatest possible degree of expansion in the finished dried and cooled product, it has been found essential to utilize one of several differential pressure processing procedures of the present invention. Known methods include the use of different forms of initial rendering treatments to remove excess fat and moisture to prepare the skin pieces for popping. Such conditioning steps include pressure cooking of skin pieces and/or hot oil bath cooking. As generally practiced, the actual popping or puffing of the skin pieces following rendering and moisture content reduction includes the use of a hot oil bath wherein the skin pieces expand to a substantial degree as, for example, from six to ten times their original size. Expansion to this extent can be rather readily obtained but a problem arises in connection with retention of this degree of expansion as well as the forming of a crisp cellular structure as a result of adequate residual moisture removal.

Essentially, in practicing the present invention any suitable skin preparation procedure for skin popping may be followed. Certain preferred preparation procedures will be described but the important differential pressure residual moisture removal processing of the present invention generally constitutes the essence thereof. Several different processing conditions are capable of adequate residual moisture removal. It is important to establish differential pressure conditions wherein the skin pieces are expanded and subjected to conditions of reduced external pressure to establish adequate internal pressure within the expanded cells.

One differential pressure procedure includes the puffing of skin pieces in an oil bath of adequate temperature with the bath being maintained in a vacuum system. Once adequate puffing of the skin pieces has occurred in the bath the pieces are merely lifted therefrom into the vacuumized surroundings and subjected to differential pressure cooling. An example of such a procedure includes the use of a vacuum of about 20 inches of mercury and an oil bath temperature of about 350° F. The immediate change in pressure resulting from the conditions described provides for flashing of residual moisture accompanied by fast cooling while skin piece expansion is retained.

Another manner of obtaining adequate differential pressure cooling as well as puffing arises from subjecting the skin pieces to pressure followed by immediate release of the skin pieces to atmospheric conditions. By way of example, the skin pieces are placed in a steam pressure cabinet under about 200 p.s.i. and upon immediate release to atmospheric conditions are not only puffed but are cooled by flashing of residual moisture with instantaneous setting of the collagen and retention of the expanded cellular state.

Another and generally preferred differential pressure procedure deals with the use of a separate final vacuum cooling step for preventing collapse of the expanded skin pieces during cooling of the same while also even resulting in further slight expansion of the pieces to an extent heretofore not known. Following expansion of the rendered and partially dehydrated skin pieces in a hot oil bath, the expanded skins are immediately transferred to a vacuum system for continued expansion, residual drying and simultaneous cooling to prevent collapse. Vacuum cooling is utilized to an extent that residual moisture is drawn from the puffed skins thus preventing any noticeable degree of toughness in the final product. Residual moisture content reduction results in rapid cooling which is important to proper setting of the protein immediately following puffing of the skins in the hot oil bath at which time the protein is in a plastic state. The drawing of a vacuum on the puffed skins establishes a positive pressure inside the expanded cells of the skins and prevents collapse upon cooling while even slightly increasing the celluar volume. When completely cooled, it has been found that atmospheric pressure application to the puffed skins does not result in alteration of the size and shape of the skins to any noticeable degree.

In connection with one embodiment of the present invention, a method of preparing puffed pork skin pieces, such as bacon rind, includes the removal of the bacon rind from bacon sides following the cooking and smoking operations. The rind should be graded for freedom from hair roots and those portions meeting the specified standards are cut into small uniform strips or pieces. The size of each piece may vary substantially depending upon the desired shape or size of the final product. By way of example, pieces of approximately 1½ by ½ inches in rectangular form are quite suitable. The rind pieces after cutting may be stored for an appreciable time at storage temperatures of about 32° to 50° F. or can be immediately treated in line with the teachings of the present invention to form a puffed edible product.

The rind pieces are placed in any suitable type of pressure cooking apparatus, preferably on a drip-type surface such as a screen for free dripping of fat from the rind during pressure cooking. This rendering step is continued for a period of time and under adequate pressure conditions to partially gelatinize and soften the tissue. It has been found that pressure cooking from about 5 to 30 minutes at 20 p.s.i. constitutes a preferred procedure with the optimum time being about 15 minutes. An example of suitable specific pressure cooking conditions includes cooking at 20 p.s.i. and 259° F. for 15 minutes.

The partially gelatinized rind pieces are preferably dried after pressure cooking to lower and control the moisture content thereof for optimum results. The rinds may be spread out on wire trays for free circulation of air or placed in a drying oven or similar device for controlled drying. Considerable variation in the finished product can be obtained by the amount of moisture present in the rind pieces at the time of popping. If the pieces are high in moisture content when puffed, vigorous bubbling and steaming takes place in the oil bath. The resultant product shows little or no expansion and is tough to chew. If insufficient moisture is present the puffs tend to expand very slowly or not at all and have a charred taste when eaten. Samples which have sufficient moisture but not an excess, expand rapidly when placed in hot fat with a minimum of bubbling and frothing and have a dry, crisp texture when cooled. It has been found that a preferred moisture content range is from about 4 to 7 percent in the pieces at the time the same are popped. A moisture content within this range gives optimum results. Moisture levels over 10% are not desirable from the standpoint of toughness in the final product and moisture levels under 4% result in a charred taste in the final product.

In controlling moisture content on the order mentioned above, the drying step is carried out in an oven from about 2 to 5 hours at 250° F. These conditions establish acceptable moisture content in the pieces. The time and temperature conditions under which the pieces are oven dried may vary widely and for optimum results the pieces are held in a forced air drying oven maintained at 250° F. for about three hours.

At this stage of the process the rind pieces may be stored for periods ranging up to several months. The pieces may be held in dry and impermeable packages or containers to preserve the proper moisture content level. On a commercial basis this feature can be of importance in that the rendered rind pieces may be prepared to this extent at their source, stored and subsequently shipped to plants in localities of distribution of the final product.

The drying step may be practiced at the plant immediately prior to puffing if desired. The conditioning of the rind pieces by rendering allows storage or shipment of the same for relatively long periods in a physical form which does not necessitate careful handling. In other words, the final puffed product is fragile and should preferably not be handled to any excessive extent following packaging of the same for merchandising. By shipping the rind pieces in rendered and unpopped condition, no special care must be taken in handling the same. This is an important feature from the standpoint of nationwide distribution.

To bring about popping or expansion of the rind pieces, one or more hot oil baths may be used. A single high temperature oil bath maintained at a temperature within the range of from about 350° to 425° F. may be used to expand the rind pieces. The pieces would be introduced into the bath and maintained therein until maximum expansion has occurred. Where more than one bath is used, an initial relatively moderate temperature bath maintained at from about 260° to 340° F. is used to blister the rind pieces and the same are maintained in this bath until they rise to the surface thereof. Upon removal of the pieces from the surface of the moderate temperature bath, the same are plunged into a high temperature bath maintained within the previously designated temperature range of about 350° to 425° F. By way of example, specific temperatures found to be suitable for use would be that of 310° F. for the low temperature bath and 410° F. for the high temperature bath. It will be understood, however, that the temperature ranges and specific temperatures designated are merely preferred and are not to be construed as limiting to the method of the present invention.

Following obtaining maximum expansion of the rind pieces, the same are subjected to pressure differential treatment as previously described. In following the preferred vacuum cooling procedure the puffed pieces are rapidly removed from the expanding oil bath and immediately transferred into a vacuum cooling system utilizing any suitable apparatus capable of impressing a vacuum preferably of 5 inches of mercury or greater. It has been found that a vacuum of 5 to 15 inches of mercury prevents collapse of the puffed rind to various degrees. Preferably, 15 to 20 inches of mercury for 30 seconds is adequate for excellent results. A vacuum of 15 inches or more is necessary to completely prevent collapse of the puffed rinds and 20 to 30 seconds is generally required for adequate vacuum cooling. Without vacuum cooling there is almost complete collapse and shriveling of the puffed rinds.

For uniform product manufacture, it has been found desirable to utilize a vacuum system which is closed to air and makes use of an inert gas such as nitrogen. As previously described, the drawing of a vacuum on the expanded rind prevents the expanded cells from collapsing and will even result in a slight increase in expansion not obtainable during the hot oil bath step. Residual moisture removal is extremely important in connection with the provision of a light fluffy product from which all toughness has been removed. Rapid vacuum cooling sets the hot plastic protein which then becomes very crisp.

The resulting product is a light, fluffy, puffed rind having an appetizing look and smell and a pleasing taste. Salt and/or flavoring agents may be added if desired prior to final packaging of the product for merchandising purposes. Other suitable taste control or conditioning procedures may also be used.

Other procedures may be followed in conditioning and popping the skin pieces prior to differential pressure treatment thereof. The use of several hot oil baths results in the manufacture of a desirable product. By way of example of an alternate procedure, the skins may be cut into pieces as previously described and immediately rendered in an oil bath maintained at a temperature of from 250° to 270° F. Rendering to the degree desired will be accomplished in about 40 to 60 minutes. The actual length of the rendering time will depend upon the thickness of the skins and the moisture content thereof. The skins are considered rendered and of sufficiently reduced moisture content when small blisters begin to form thereon.

The blistered skins are removed from the first oil bath, drained and either placed immediately in a second hot oil bath or they may be cooled and stored for an appreciable time until further processing is desired. The second oil bath is preferably maintained at a temperature within the range of from about 300° to 320° F. The blistered skins are introduced into this bath and maintained therein until a change in specific gravity occurs and the skins rise to the top of the bath. This bath brings about a further reduction in moisture content as well as a change in the elastic properties of the collagen of the skins.

Preferably, following removal from the second oil bath, the skins are held for 30 seconds to 1½ minutes in air before plunging them into a third hot oil bath. This short holding time provides for sufficient drainage of the skins as well as partial drying of the same. The third oil bath is the popping bath and is preferably maintained at a temperature within the range of from about 390° to 420° F. The skins are plunged into the third bath and held therein until maximum swelling occurs. Maximum swelling will normally occur within about 5 to 10 seconds. The expanded skins are then rapidly subjected to pressure differential treatment.

The foregoing specified skin conditoning and popping procedures are preferred in that a superior product is formed. The vacuum cooling step preferably common to both of these procedures is of utmost importance in the preparation of the improved product. It will be understood that other suitable conditioning and popping methods may be utilized as long as adequate expansion of the skin pieces is obtained. However, in order to obtain the improved product of the present invention, it is necessary to utilize a differential pressure residual moisture removal treatment.

Bacon rinds are particularly adapted for use as a starting material with the puffed product incorporating therein the cured and smoked bacon taste. Fat back skins have also been used to form a similar product. Fat back skins need not be smoked in order to be capable of use as a starting material, it being understood that suitable seasoning may be added to the final product.

Obviously many modifications and variations of the invention as hereinbefore set forth may be made without departing from the spirit and scope thereof, and therefore only such limitations should be imposed as are indicated in the appended claims.

We claim:

1. A method of preparing a puffed edible skin product which comprises heat treating edible skin pieces having a miosture content of about 4 to 10% to expand the same to an extent that the same is provided with a thin walled cellular structure, and cooling said expanded skin under vacuum immediately following final expansion thereof to at least substantially set and retain the extent of expansion obtained.

2. A method of preparing a puffed edible skin product which comprises heat treating edible skin pieces having a moisture content of about 4 to 10% to expand the same to an extent that the same is provided with a thin walled cellular structure, and cooling the expanded skin under vacuum in a dry gas system immediately following final expansion thereof to at least substantially set and retain the extent of expansion obtained, the vacuum under which cooling takes place being at least about 5 inches of mercury and establishing a positive pressure within the cellular structure of the expanded skin to prevent collapse thereof during protein setting.

3. A method of preparing a puffed pork edible skin product which comprises pressure cooking relatively small and uniform pieces of skin to an extent that said pieces are partially gelatinized and softened, drying said skin to reduce the moisture content of the same to about 4 to 10%, expanding the skin by oil bath cooking, and cooling said expanded skin under dry vacuum conditions immediately following final expansion thereof to at least substantially remove residual moisture content and set and retain the extent of expansion obtained, the vacuum conditions under which cooling takes place being adequate to establish a positive pressure within the cellular structure of said expanded skin to prevent collapse thereof during protein setting.

4. The method of claim 3 wherein said edible skin is bacon rind.

5. A method of preparing a puffed pork edible skin product which comprises dividing said skin into rectangular pieces of about 1½ by ½ inches, pressure cooking the pieces of skin for about 5 to 30 minutes at 20 p.s.i. to partially gelatinize and soften the same, drying said skin under heated circulating air conditions to reduce the moisture content thereof to about 4 to 10%, expanding the skin by oil bath cooking, and cooling said expanded skin under dry vacuum conditions immediately following final expansion thereof to at least substantially remove residual moisture content and set and retain the extent of expansion obtained.

References Cited in the file of this patent

UNITED STATES PATENTS

| | | |
|---|---|---|
| 2,179,616 | Darrow | Nov. 14, 1939 |
| 2,345,463 | Cox | Mar. 28, 1944 |